April 27, 1965    E. A. I. JOHANSSON    3,180,652
CHILDREN'S SLEDS
Filed Sept. 5, 1963    3 Sheets-Sheet 2

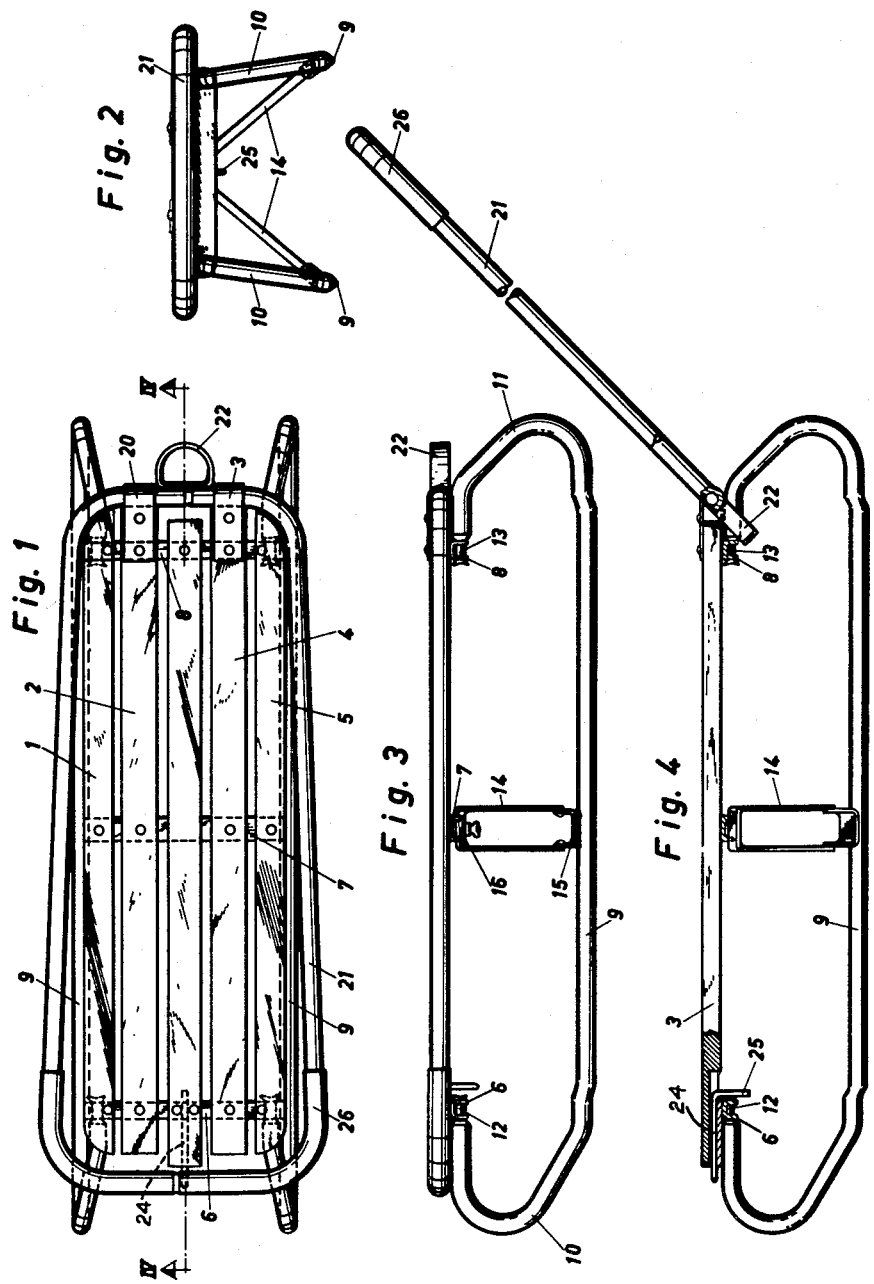

April 27, 1965   E. A. I. JOHANSSON   3,180,652
CHILDREN'S SLEDS

Filed Sept. 5, 1963   3 Sheets-Sheet 3

United States Patent Office 3,180,652
Patented Apr. 27, 1965

3,180,652
CHILDREN'S SLEDS
Ebbe Anders Israel Johansson, 6 Kaptensgatan,
Halmstad, Sweden
Filed Sept. 5, 1963, Ser. No. 306,732
Claims priority, application Sweden, Sept. 7, 1962,
9,676/62
5 Claims. (Cl. 280—20)

The present invention relates to sleds, in particular children's sleds, and of the kind which are provided at the rear end with an upwardly projecting yoke serving as a handle for pushing the sled.

The invention which has for its object to provide a push sled of this type which may easily be converted into a toboggan-type of sled is mainly characterised in that the handle yoke is foldable downwardly towards the top portion or seat of the sled.

According to the invention the yoke is preferably wider than the top portion so that when the yoke is folded down the legs thereof will enlarge the effective supporting surface of the top or seat portion.

According to the invention the yoke may also have greater length than the top portion, so that when the yoke is folded down it will form a frame surrounding the top portion substantially in the same plane as the top portion.

According to one embodiment of the invention the yoke consists of two tubes bent into U-shape, the legs thereof being connected two and two for forming the smaller sides of an elongated closed frame.

In order to further reduce the storage space required for the sled the runners may be foldable towards the top portion in a manner known per se whereby, according to the invention, supporting means for the runners in their folded-out position of use are formed by two struts situated opposite one another and having one end pivotally connected to the runners, means also being provided at the lower side of the top portion for detachably securing the other end of each of said struts.

Figure 5:
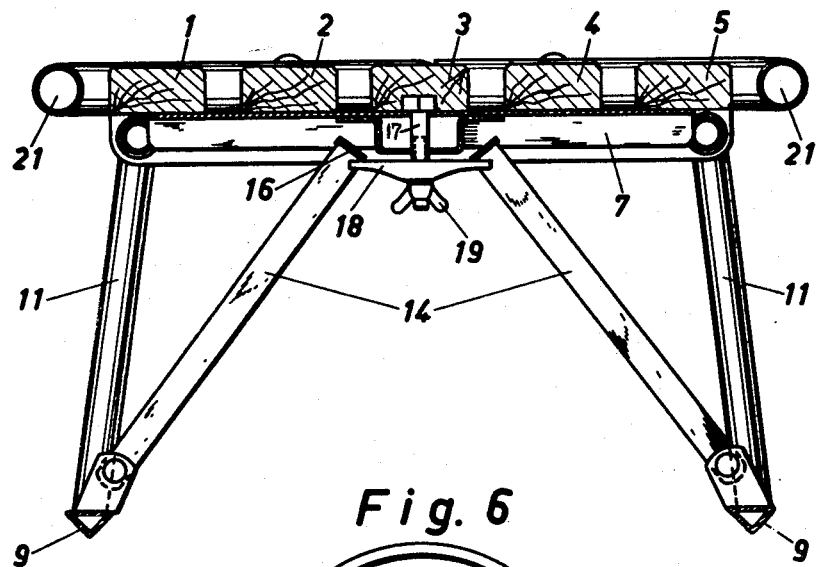
Figure 6:
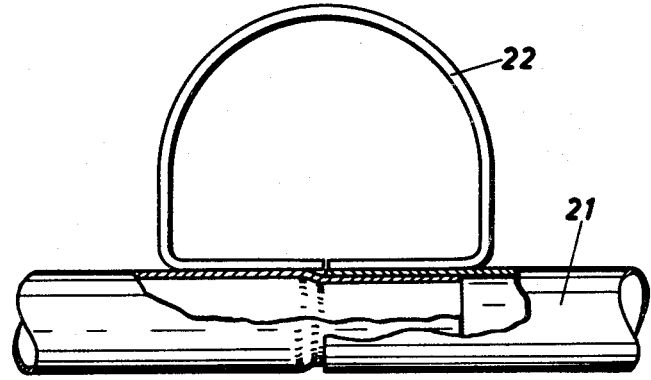
Figure 7:
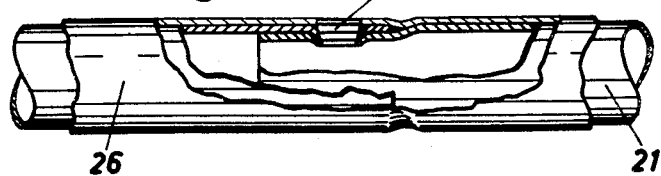
Figure 8:
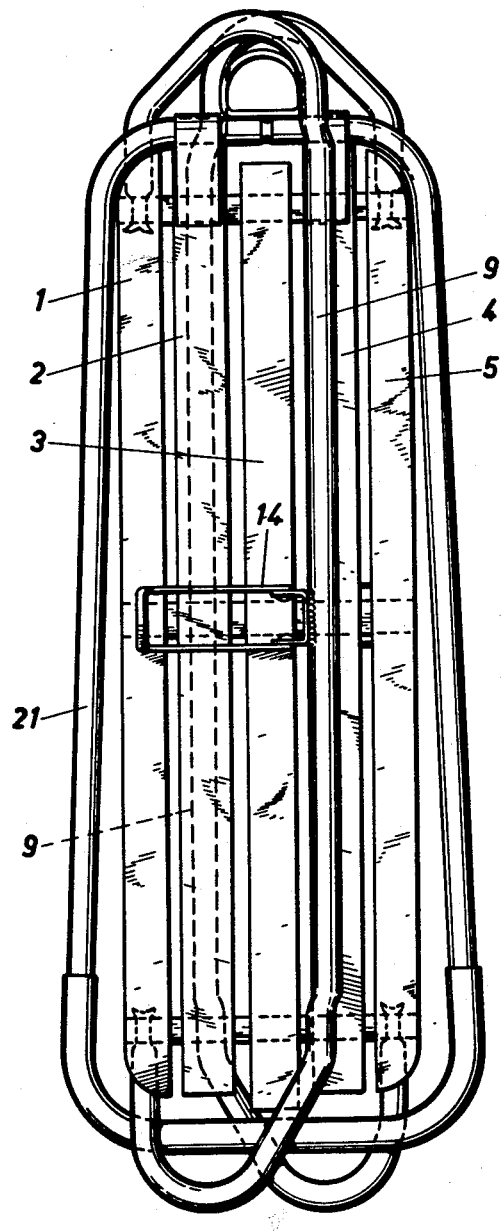
Figure 9:
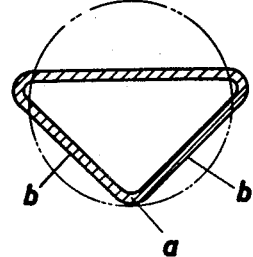
Figure 10:
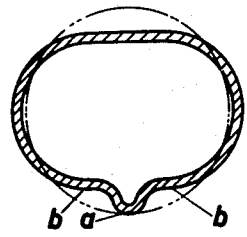
Figure 11:
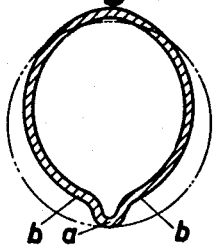
Figure 12:
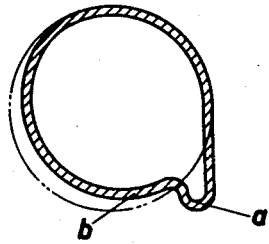

One embodiment of the invention will be more closely described herebelow with reference to the accompanying drawings wherein:

FIG. 1 is a top plan view of a collapsible sled made in accordance with the invention with the handle yoke in the folded-down position, FIG. 2 is a front elevation of the sled, FIG. 3 is a side elevation, FIG. 4 is a longitudinal section substantially along the line IV—IV in FIG. 1 with the pivoted handle yoke shown in the upwardly swung position, FIG. 5 is a cross section to a larger scale through the sled showing the means for detachably locking the runners in the folded-out position, FIGS. 6 and 7 are partly broken views to a further enlarged scale of certain portions of the handle yoke, FIG. 8 illustrates the sled in the collapsed position, FIG. 9 is a cross section to a larger scale through one of the runners of the sled, and FIGS. 10–12 are corresponding cross sections showing other forms of the runner section.

In the embodiment shown in the drawings the top portion or seat of the sled is formed by five parallel wooden laths 1–5 which are slightly spaced from one another and which are secured to and interconnected by means of cross pieces 6, 7 and 8 in the form of downwardly open channel iron at the lower side of the top portion. The cross piece 6 is disposed adjacent the front end of the sled, the cross piece 8 adjacent the rear end, and the cross piece 7 approximately halfway between the other two. The runners of the sled consist of bent tubes the straight middle portion 9 of which has the triangular cross section illustrated in FIGURE 9 and connects to upwardly curving front and rear portions 10 and 11, respectively, which have circular cross section and terminate in smaller diameter and portions 12 and 13, respectively, directed towards one another, the runners being pivoted by means of said end portions in coaxially disposed holes in the side portions of the cross pieces 6 and 8.

For securing the runners in the folded-out position of use shown in FIGS. 1–5 there are provided struts extending from the runners 9 to the lower side of the top portion. In the embodiment shown each strut consists of an elongated yoke 14 which has the end portions of its legs pivotally connected to the legs of a U-shaped bracket 15 welded to each runner and which is adapted, when the runners are folded out, to engage with its middle portion 16 in registering openings in the downwardly directed edges of the side portions of the middle cross piece 7 (see especially FIG. 5). A downwardly directed bolt 17 is secured to the cross piece 7 and a clamping piece 18 is displaceable on said bolt by means of a winged nut 19 on the end of the bolt 17 for being pressed by said nut against the middle portions 16 of the yokes 14 when said portions 16 are engaged in said openings in the cross piece 7. In order to collapse the sled the winged nut 19 is unscrewed and the clamping piece 18 is rotated out of engagement with the yokes 14, so that these may be moved out of engagement with the cross piece 7 whereafter the runners may be swung towards the top portion of the sled. As illustrated in FIG. 8 one of the runners may be folded against the lower side of the top or seat portion while the other runner is folded against the upper side of the top portion, but it is also possible to fold both runners against either the lower side or the upper side of the top portion.

At the rear edge of the top or seat portion of the sled there are provided two attachment members 20 secured each to one of the ribs 2 and 4, said attachment members being bent into sleeve shape for embracing one of the small sides of an elongated yoke 21 made of tubing in the form of a closed frame which is swinbaly carried by said attachment members 20. The yoke 21 is composed of two tubes bent into U-shape and having the ends of their leg portions connected two and two. These connections are made by providing the end portion of one leg with a somewhat smaller diameter and inserting said smaller diameter portion into the end portion of the other leg as illustrated in FIGURE 6 which shows the connection between the two yoke leg portions at the rear end of the yoke 21, and in FIGURE 7 which shows the corresponding connection at the front end of the yoke or frame. At the rear side the legs of the two tubes are secured in the interconnected position by means of a loop 22 of band iron welded to the two tube ends. At the front end of the yoke 21 the leg ends of the two tubes have been secured to one another as illustrated in FIGURE 7 by punching a hole through the walls of both tubes so that the edge portions of the hole in the outer tube engage in the hole in the inner tube. The hole 23 serves for receiving the end portion of a pin 24 which is displaceably mounted at the lower side of the rib 3 at the front end thereof, said pin having a downwardly bent end portion by means of which the pin may be moved into and out of engagement with the hole 23 for locking the yoke 21 in the downwardly folded position shown in FIGS. 1–3 or for releasing the yoke for swinging to the position illustrated in FIG. 4 wherein the band iron loop 22 will abut against the rear cross piece 8 and thereby prevent continued swinging of the yoke 21. The length and width of the yoke 21 somewhat exceeds the length and width, respectively, of the top or seat portion of the sled so that, in the folded-down position, the yoke will surround the top or seat portion like a frame and thereby enlarge the effective supporting surface of the top portion. The front portion of the yoke 21 which is intended to serve as a handle portion is provided with a plastic or the like coating 26, for instance in the form of a piece of plastic hose pushed onto the yoke.

With the runner section illustrated in FIGURE 9 good tracking is provided by the downwardly directed edge $a$, and the wide side portions $b$ provide large enough supporting surfaces to support the sled on soft snow. The runner section may of course be modified in several ways for achieving the same results and a few embodiments are shown in FIGURES 10–12 wherein the tracking edge of the runners is indicated at $a$ and the supporting surfaces at $b$ as in FIGURE 9.

The invention is not limited to the embodiment hereinbefore described and shown in the drawings as an example only, said embodiment being capable of various modifications with respect to its details without departing from the basic concept of the invention.

What I claim is:

1. A sled having a handle yoke provided rearwardly on the seat portion of the sled in a position projecting upwardly from said seat portion and being foldable against said seat portion, said handle yoke comprising two tubes which are bent into U-shape and have their leg portions connected two and two for forming the shorter sides of an elongated closed frame.

2. A sled as claimed in claim 1, characterised in that said tubes have one leg portion pivotally carried in sleeve-shaped attachments provided at the rear end of the sled and at substantially the same height as the seat portion.

3. A sled as claimed in claim 1, characterised in that one of those leg portions of said tubes which in the folded-down position of said yoke are disposed at the front end of the sled has its end portion inserted into the end portion of the other one of said leg portions.

4. A sled comprising a seat portion, runners pivotally connected to said seat for being folded thereagainst, a pair of struts arranged opposite one another and each having one end pivotally connected to one of said runners, a bolt extending from said seat portion, a clamping piece displaceably mounted on said bolt, a cross-piece provided on said seat portion and a wing-nut in threaded engagement with said bolt for moving said clamping piece therealong and detachably clamping the other ends of said struts against said cross-piece.

5. A sled comprising a seat portion, runners pivotally connected to said seat portion for being folded thereagainst, a pair of struts arranged opposite one another and each having one end pivotally connected to one of said runners, a cross-piece provided on said seat portion and having seats for receiving the other ends of said struts, a bolt secured to said cross-piece, a clamping piece displaceably mounted on said bolt and a winged nut in threaded engagement with said bolt for pressing said clamping piece against said struts for detachably maintaining said struts other ends in said cross-piece seats.

References Cited by the Examiner

UNITED STATES PATENTS

| 462,634 | 11/91 | Bouton | 280—23 |
| 980,604 | 1/11 | Coleman | 280—20 |

FOREIGN PATENTS 230,823   4/44   Switzerland.

ARTHUR L. LA POINT, *Primary Examiner.*